United States Patent [19]

Gauronski et al.

[11] Patent Number: 5,164,842
[45] Date of Patent: Nov. 17, 1992

[54] JOB/PAGE PROOFING FOR ELECTRONIC PRINTERS

[75] Inventors: John F. Gauronski, Rochester, N.Y.; Acco Hengst, Lewisville, Tex.; Alane H. Rowold, Rochester, N.Y.

[73] Assignee: Xerox Corporation, Stamford, Conn.

[21] Appl. No.: 546,617

[22] Filed: Jun. 29, 1990

[51] Int. Cl.$^5$ ............................................. H04N 1/00
[52] U.S. Cl. ................................. 358/401; 358/403; 358/444; 358/296
[58] Field of Search ............... 358/401, 403, 404, 437, 358/444, 296, 300; 355/313, 314, 310

[56] References Cited

U.S. PATENT DOCUMENTS

| | | | |
|---|---|---|---|
| 4,561,016 | 12/1985 | Jung et al. | 358/76 |
| 4,588,282 | 4/1986 | Levine | 358/300 |
| 4,655,577 | 4/1987 | Ikuta | 358/296 |
| 4,656,525 | 4/1987 | Norris | 358/401 |
| 4,714,940 | 12/1987 | Inoue et al. | 355/202 |
| 4,734,789 | 3/1988 | Smith et al. | 358/300 |
| 4,740,814 | 4/1988 | Folkins | 355/202 |
| 4,806,978 | 2/1989 | Nakatani et al. | 355/202 |
| 4,947,345 | 8/1990 | Paradise et al. | 358/442 |
| 4,829,468 | 5/1989 | Nonaka et al. | 364/900 |
| 4,956,667 | 9/1990 | Gartner | 355/314 |
| 4,995,103 | 2/1991 | Tsukada et al. | 358/451 |
| 5,051,839 | 9/1991 | Nakahara et al. | 358/401 |

FOREIGN PATENT DOCUMENTS 0055369 7/1982 European Pat. Off. .
0182042 5/1986 European Pat. Off. .
0262603 6/1988 European Pat. Off. .

OTHER PUBLICATIONS

"Multi-Task Management Algorithm for a Printer," IBM Technical Disclosure Bulletin, vol. 38, No. 8, Jan. 1988, pp. 135-136.

Primary Examiner—Edward L. Coles, Sr.
Assistant Examiner—Thomas L. Stoll
Attorney, Agent, or Firm—Frederick E. McMullen

[57] ABSTRACT

An electronic printer with a scanner for scanning the document pages of a job and converting the document images scanned to pixels, a printer for making prints of the documents from the pixels in accordance with job programming instructions, the scanner and printer operating asynchronously with respect to one another, and proofing of one or more pages of a job is effected by interrupting the job currently being scanned by the scanner to scan the proof job while continuing printing of other jobs in the print queue, and when the proof job is ready, interrupting the job being printed to print the proof job while resuming scanning of the interrupted job.

10 Claims, 18 Drawing Sheets

JOB/PAGE PROOFING FOR ELECTRONIC PRINTERS

The invention relates to high speed electronic printers, and more particularly, to a system for proofing print jobs.

Electronic printers utilize image signals or pixels to generate prints. Typically, the printer includes a document scanner which scans the document pages that make up the job to be printed and convert the document images to pixels. The pixels, which may undergo various processing in order to provide the print output programmed, are used to modulate the laser beam of a laser printer to provide the number and type of prints programmed for the job.

When processing print jobs of this type, it is often desirable to see what the printed output will look like prior to running the job. This permits costly mistakes to be avoided where a proof before the job is run would have shown that the prints would be unacceptable. Further, electronic printers typically provide means for manipulating the job once the job is scanned in and is in pixel form. While this manipulation may take various forms, one desirable job processing feature is the ability to edit a job before printing. In this context, it would be highly desirable to allow the edited job, either during the editing process or following its conclusion, to be proofed so that the printed output that will result can be checked for suitability prior to running the job.

In high speed electronic printers where maintaining throughput is highly important and often critical, making proofs can be a handicap if it results in substantial lost time while the proofing process is underway. Thus, the ability to make proofs may lose its attractiveness if all printing operations must be shutdown and the printer devoted exclusively to running the proof job.

In the prior art, U.S. Pat. No. 4,740,814 to Folkins discloses a preview system for a copier in which an altered image may be viewed on a video screen before a hard copy is made. U.S. Pat. Nos. 4,806,978 to Nakatani et al and 4,734,789 to Smith et al disclose electronic editing boards or pads for use in editing documents prior to making copies. U.S. Pat. No. 4,656,524 to Norris et al discloses an electronic copier with display system to enable the document, once scanned, to be viewed and edited, while U.S. Pat. No. 4,655,577 to Ikuta discloses a photocopier in which the original document, once recorded, can be read with or without editing prior to making copies. And U.S. Pat. No. 4,588,282 to Levine discloses a copier with portable scanner, with means to visually display the document image, while U.S. Pat. No. 4,714,940 to Inoue et al discloses an image system with scanner to scan a document, store the scanned image in memory, and view the document on a display.

In contrast, the present invention provides a method of operating an electronic printer to make proof prints, the printer processing printing jobs in accordance with printing instructions, each of the printing jobs comprising one or more pages of hard copy document originals, comprising the steps of: programming the printer with printing instructions for each printing job; scanning the document original pages that comprise each job and converting the pages to electronic pages; combining the electronic pages of each job with the printing instructions for the job to provide a job file for each of the jobs; storing the job files in memory pending printing; for printing, forming a print queue with the jobs in a preset printing priority for successive accessing of the print files therefor when printing the jobs; for the proof prints, interrupting the job file succession in the print queue to insert the job file for the proof prints in the job file succession for printing the proof prints at the earliest opportunity; the printer, on detecting the proof prints, interrupting the job currently being printed; reprogramming the printer with the printing instructions from the job file for the proof prints; using the job file, printing the proof prints to provide a proof print of the electronic pages of the proof prints; detecting the interrupted job file as printing of the proof prints is ending; reprogramming the printer with the printing instructions from the job file for the interrupted job; and resuming printing of the interrupted job.

IN THE DRAWINGS

Figure 1:
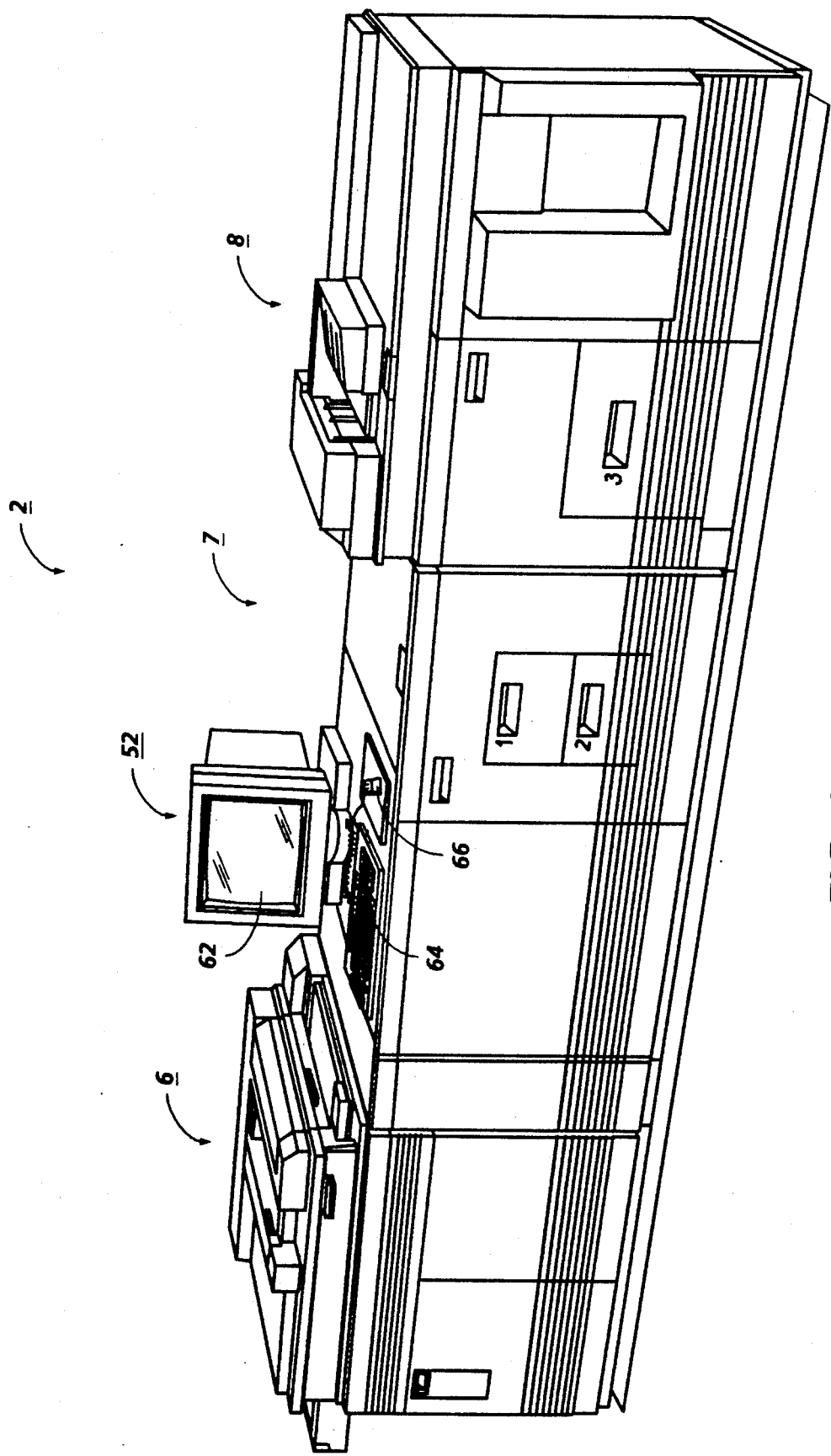
FIG. 1 is a view depicting an electronic printing system incorporating the proof printing process of the present invention.
Figure 5A:
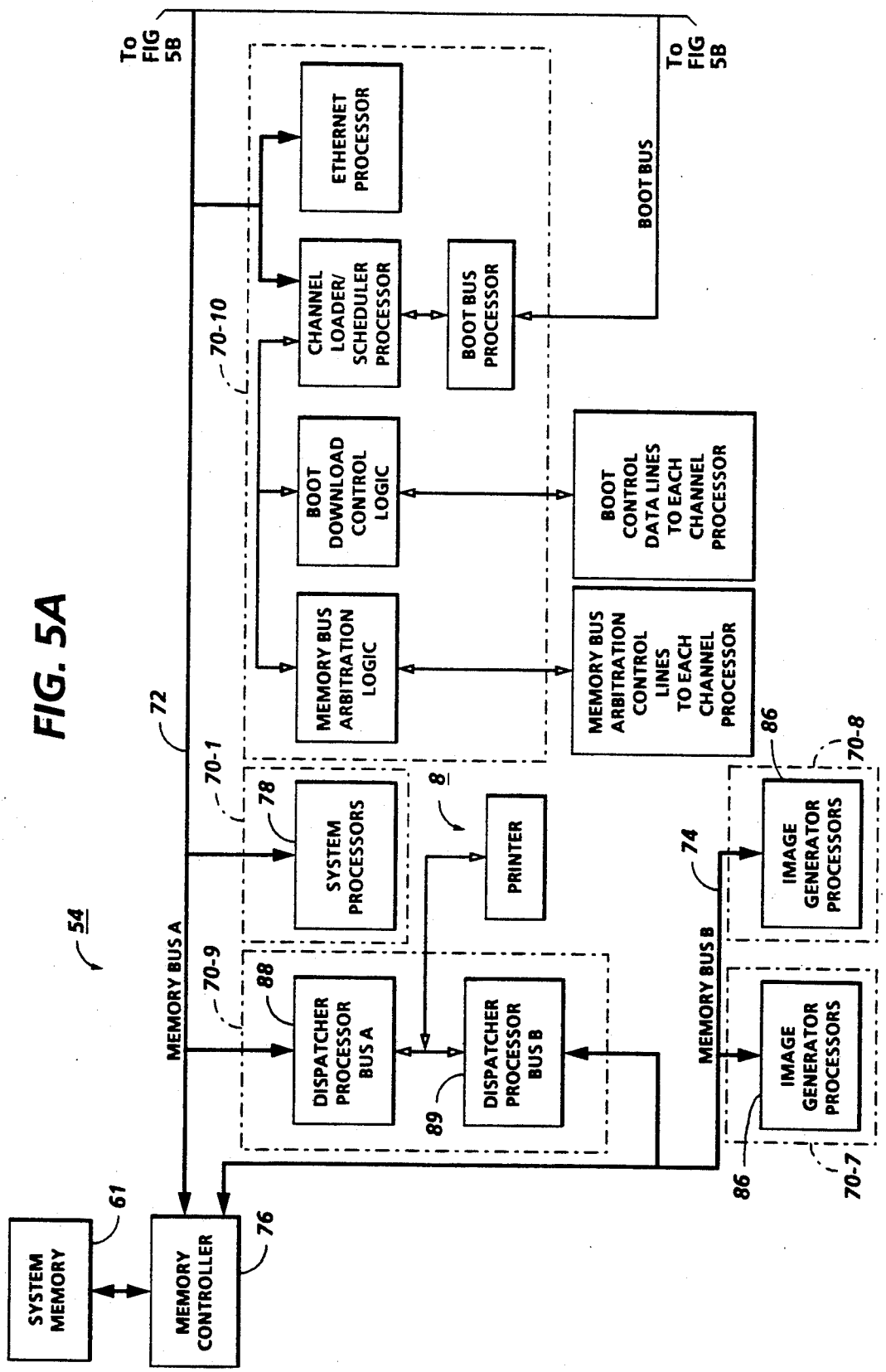
Figure 5B:
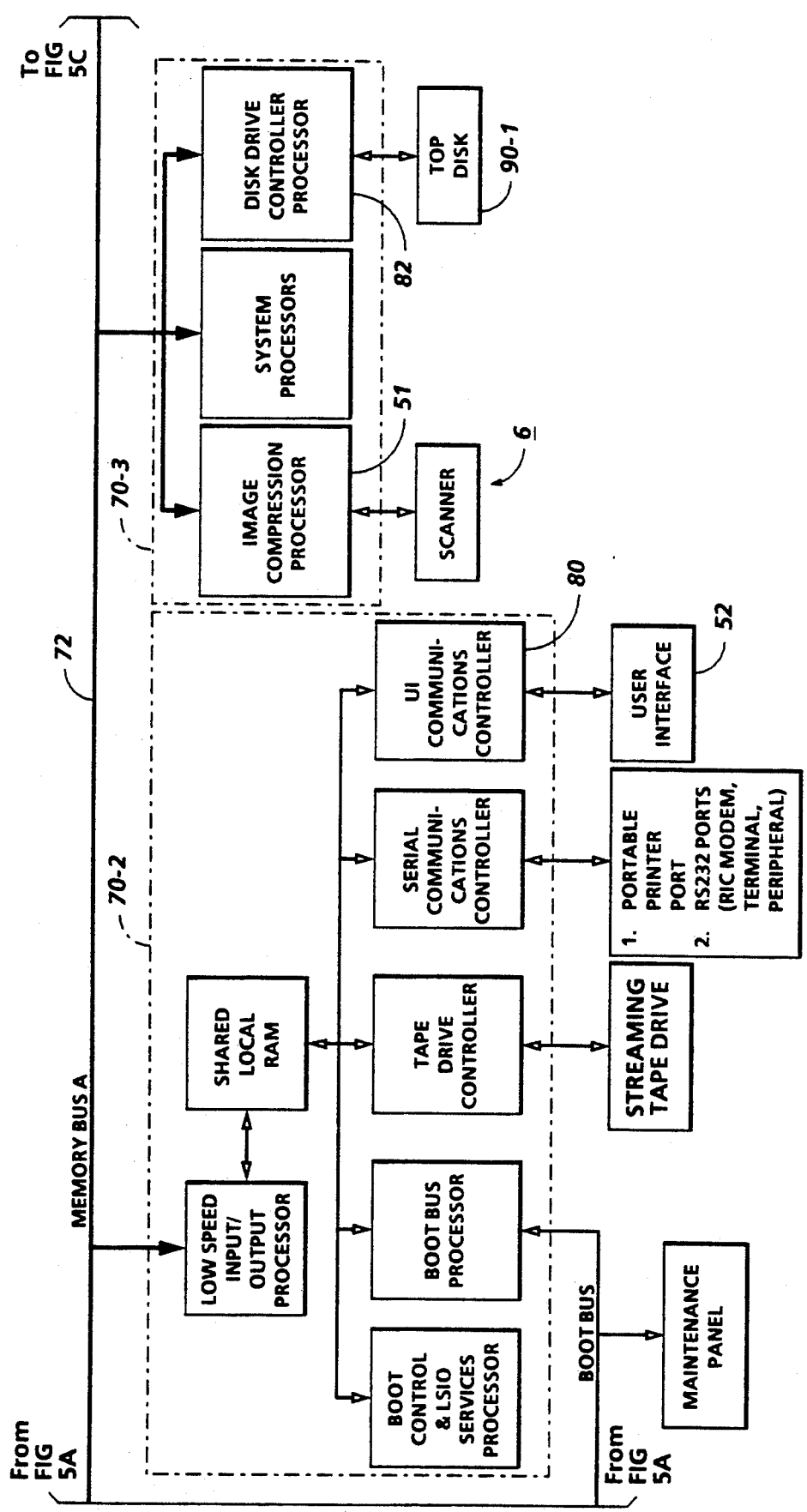
Figure 5C:
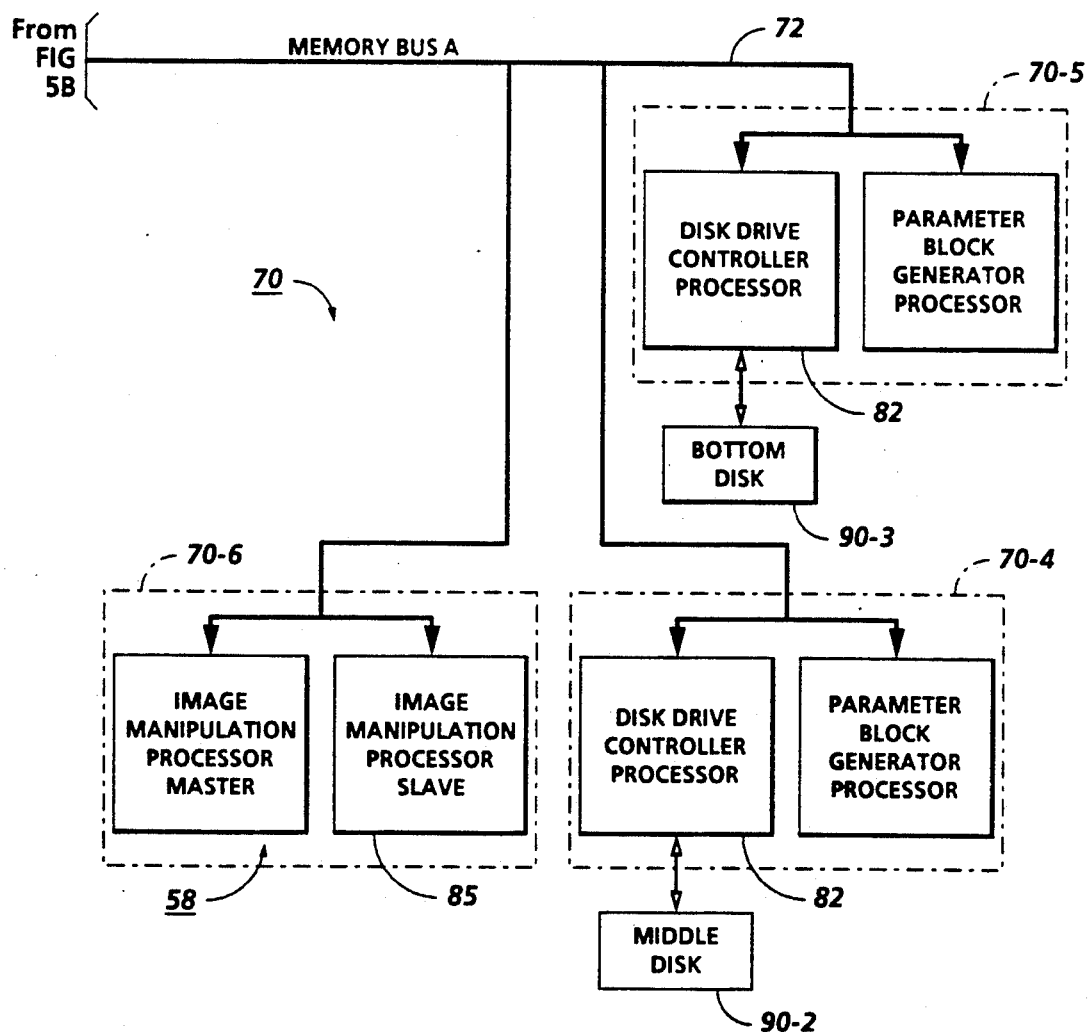
Figure 6:
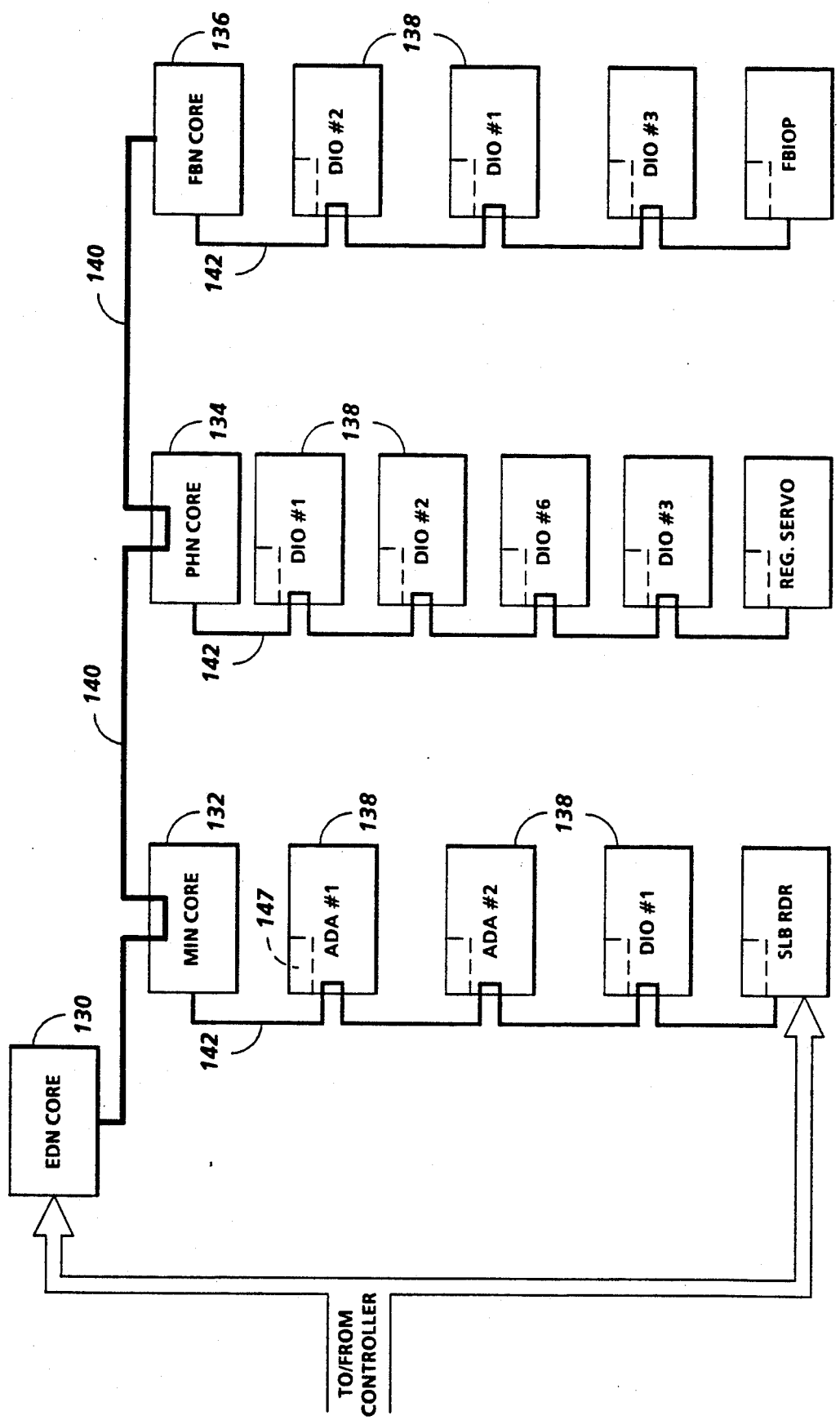
Figure 7:
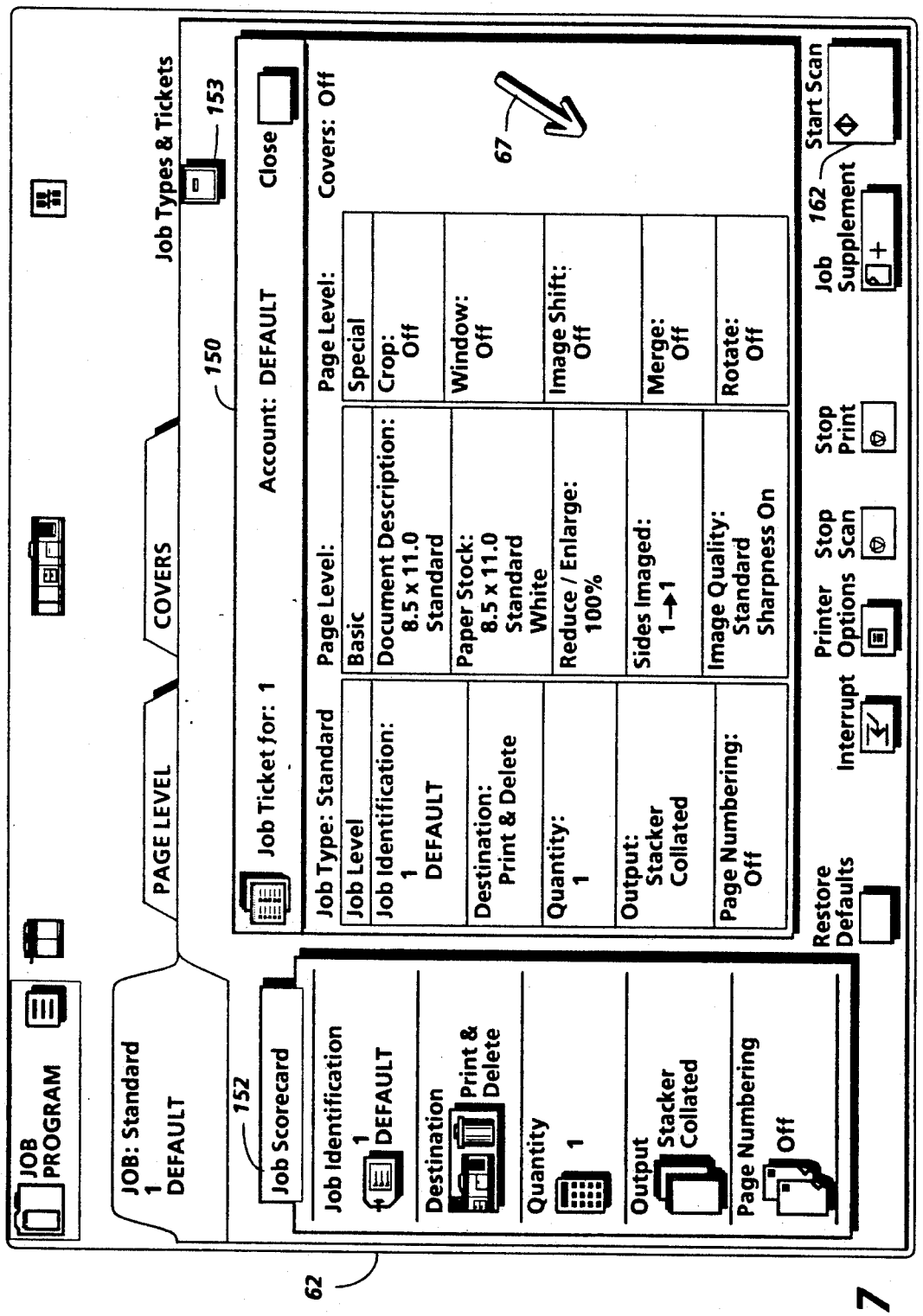
Figure 8:
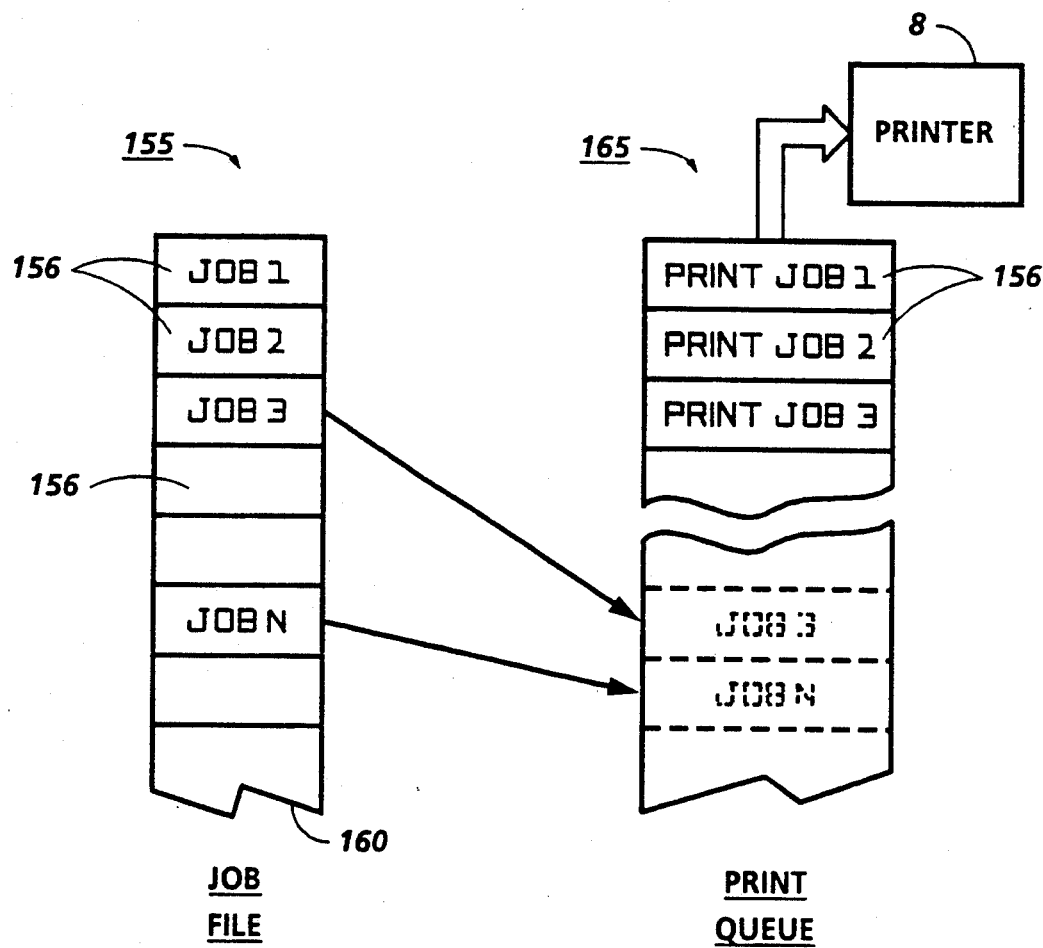
Figure 9:
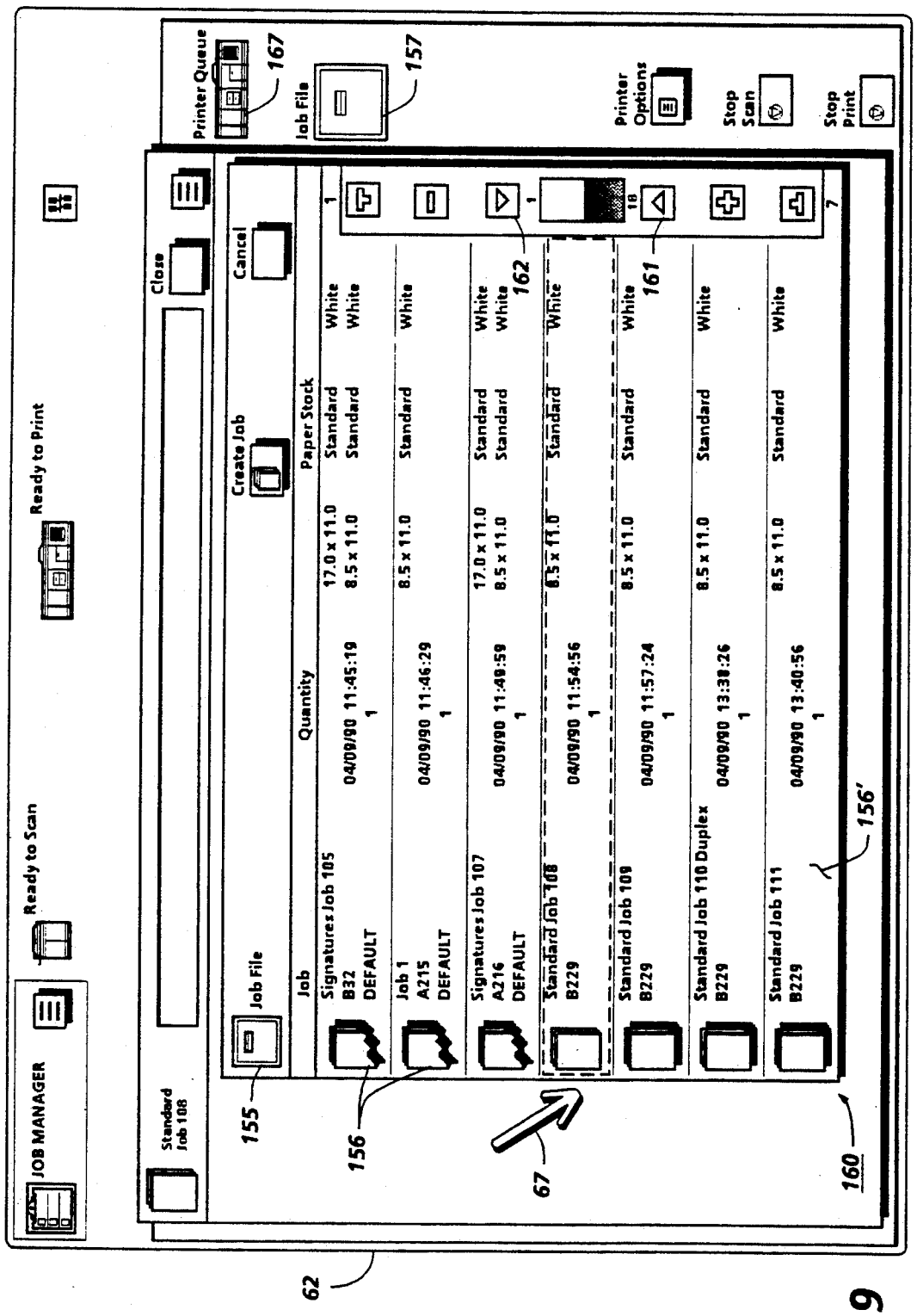
Figure 10:
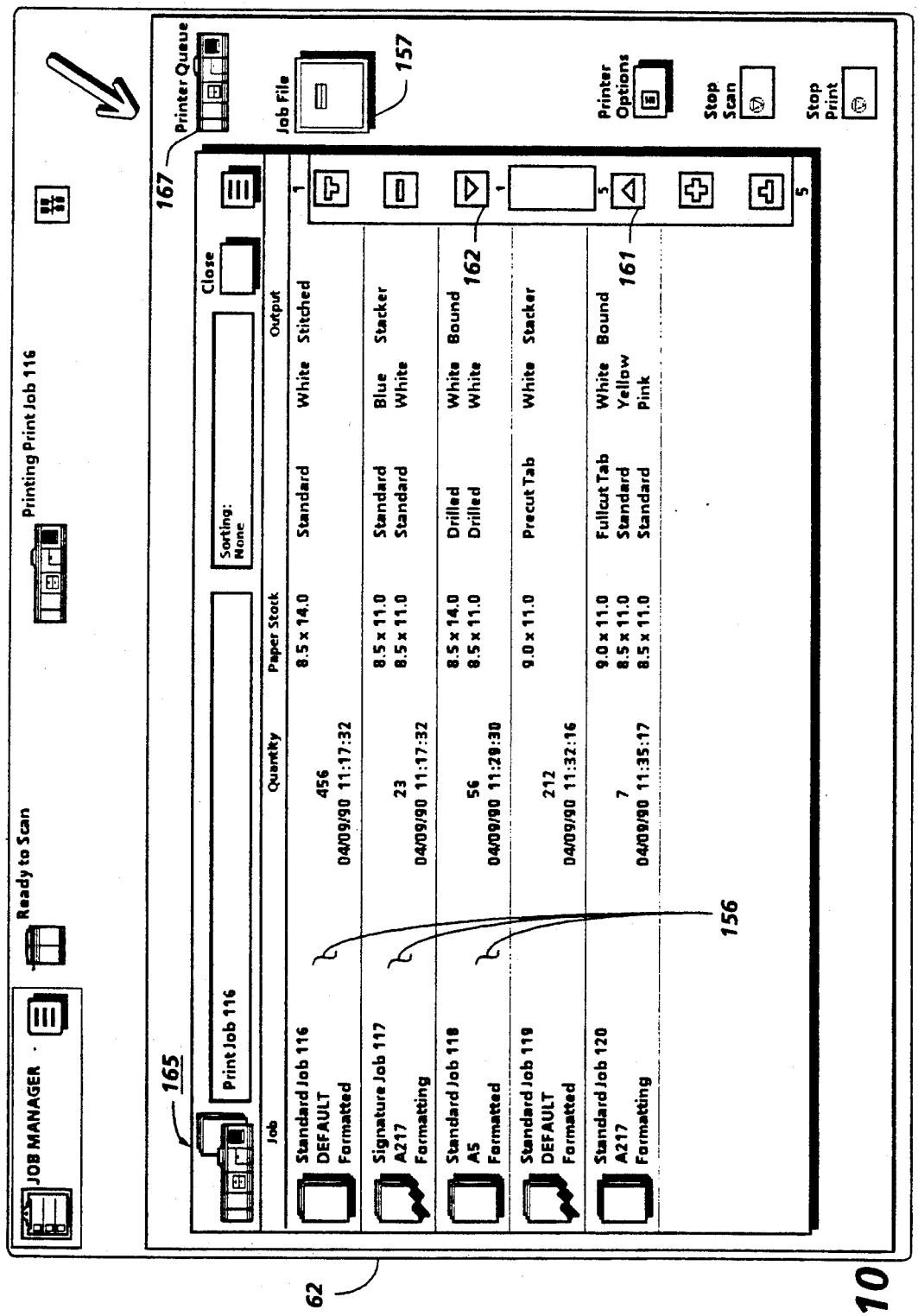
Figure 11:
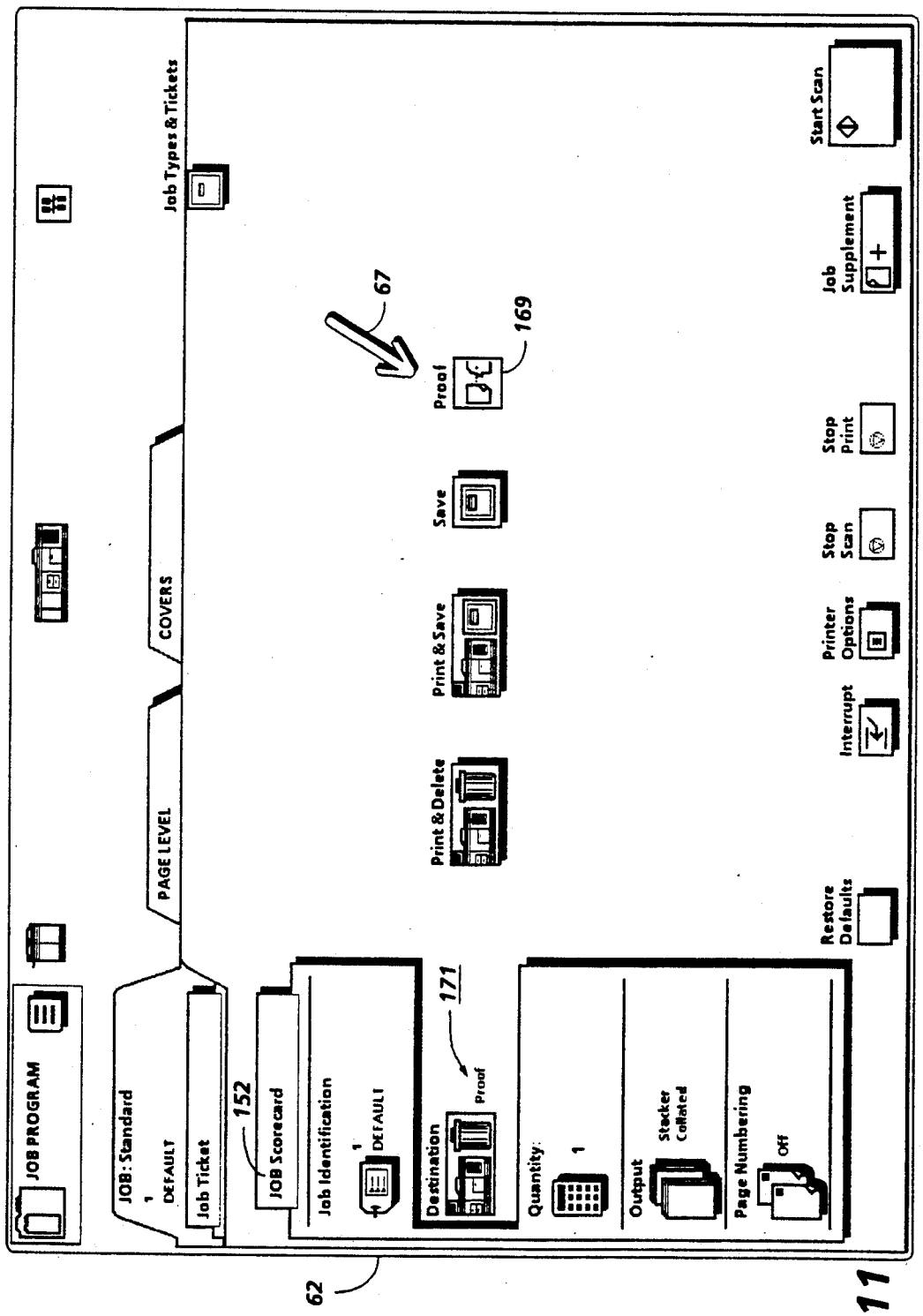
Figure 12:
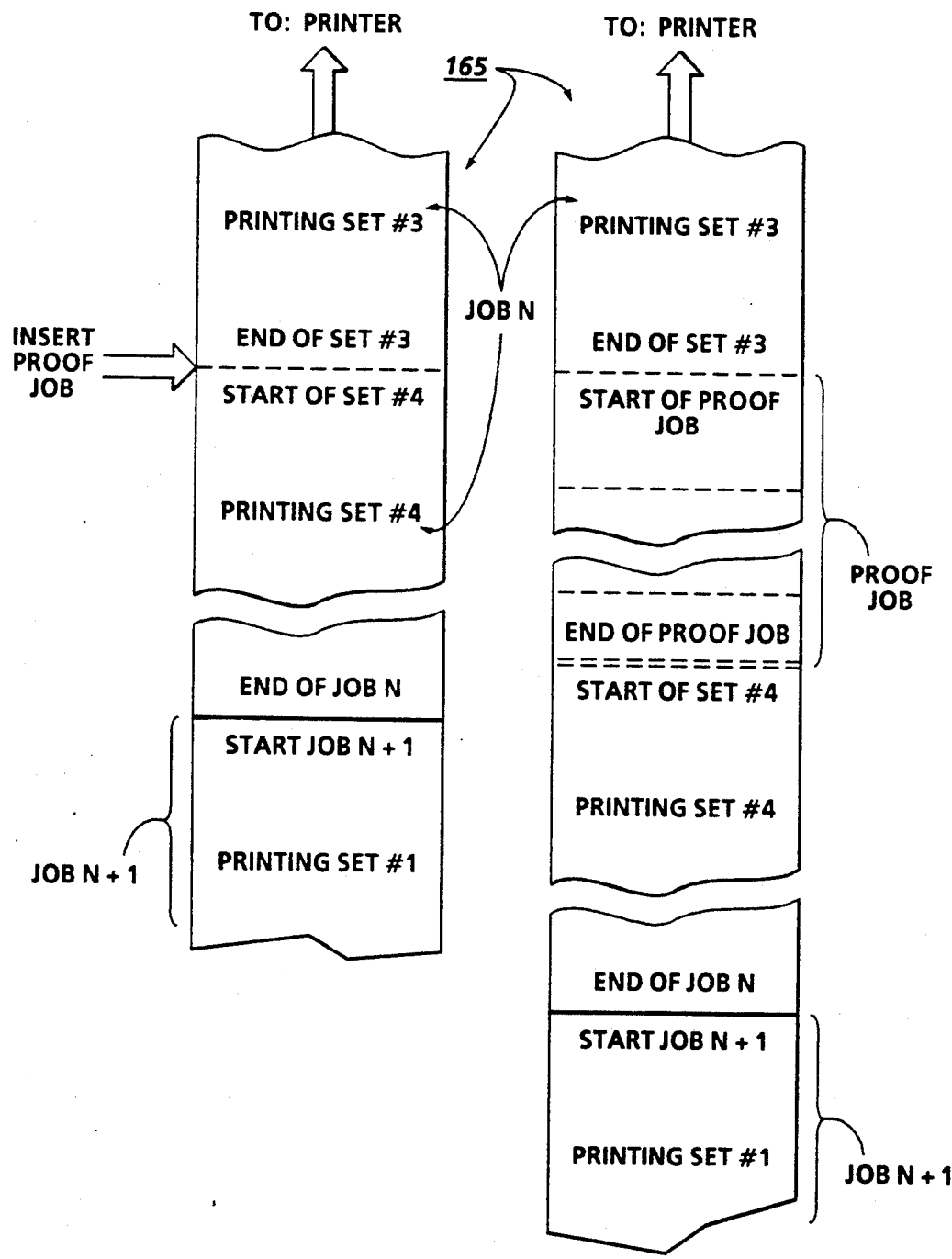
Figure 13:
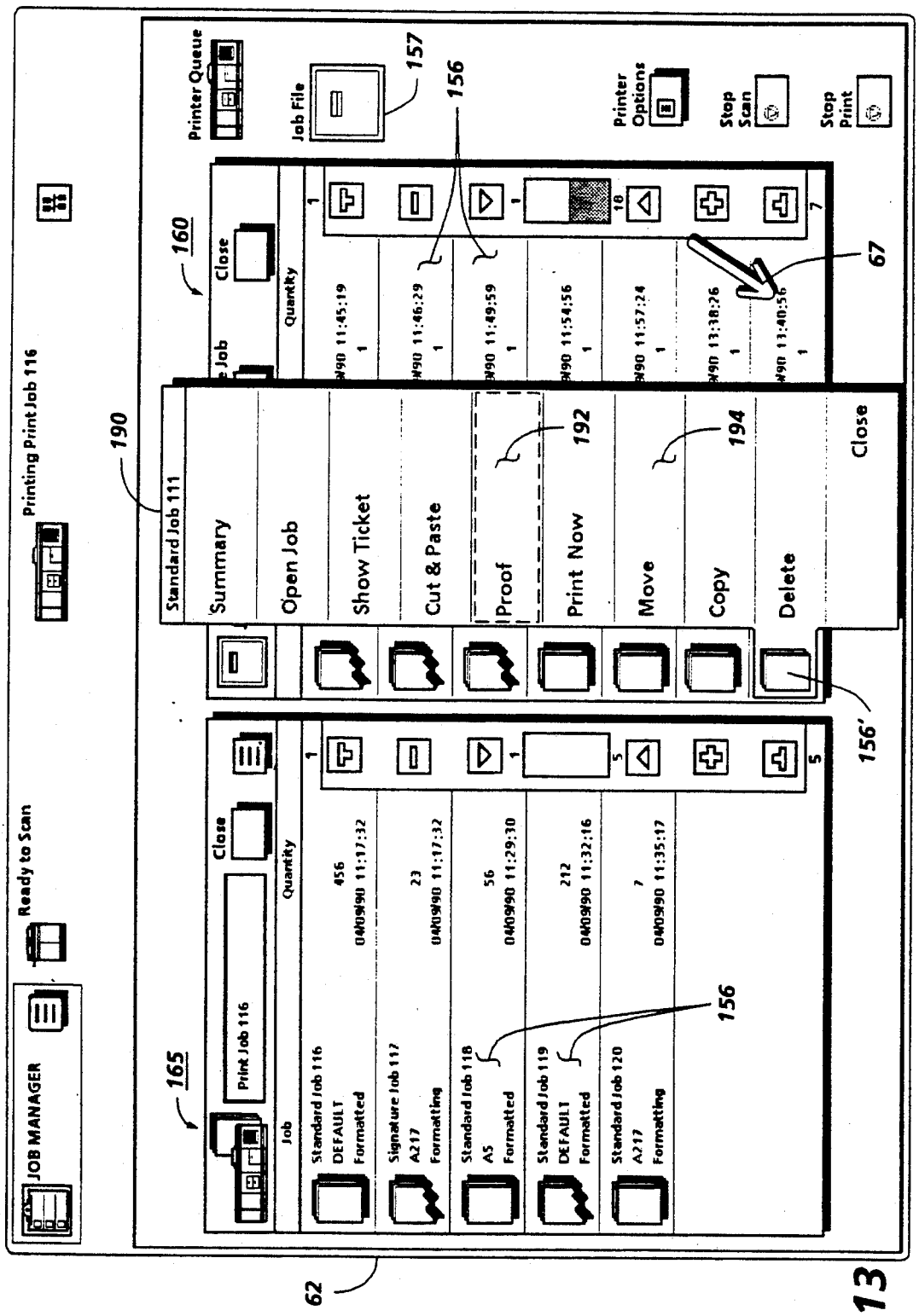
Figure 14:
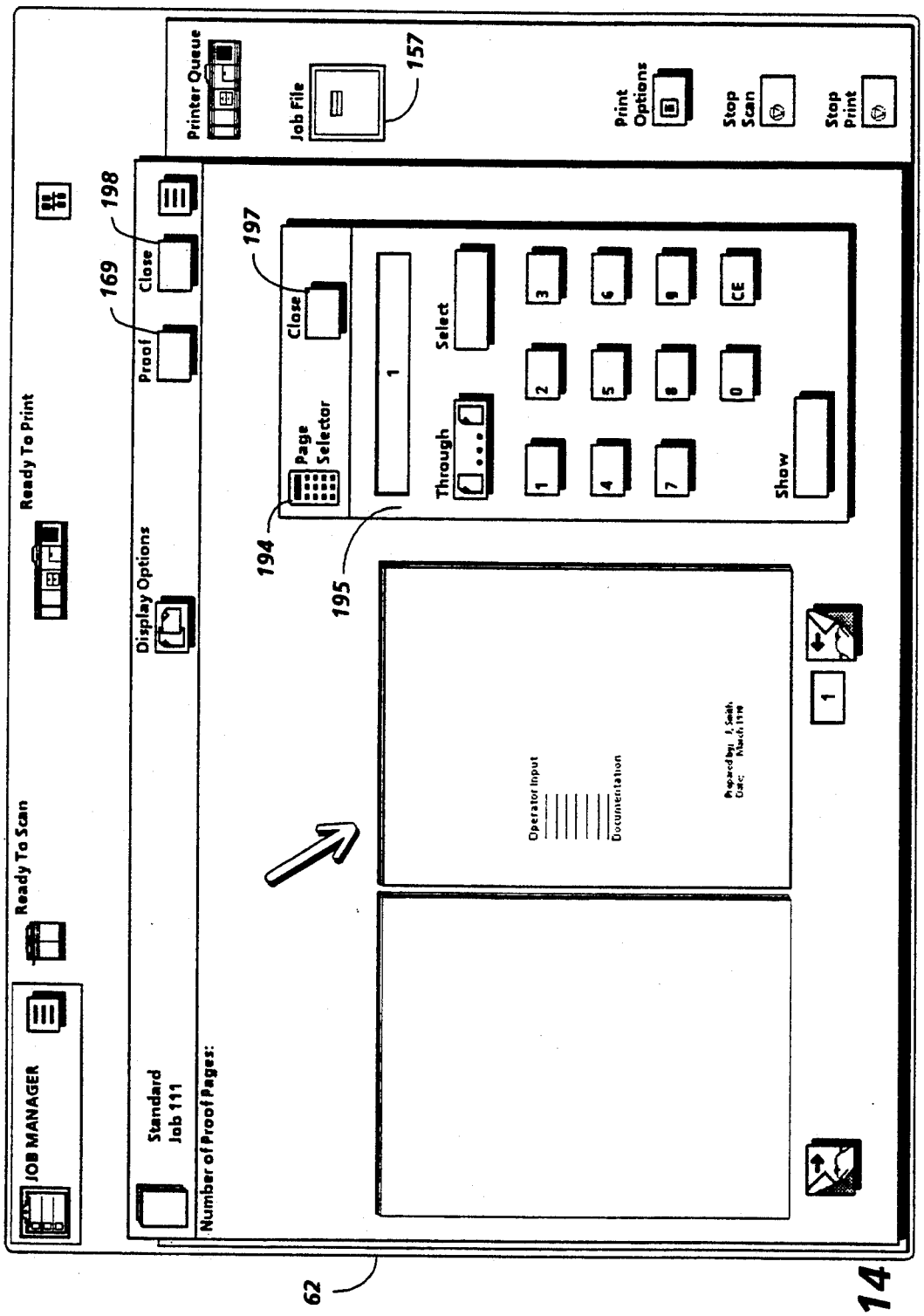
Figure 15A:
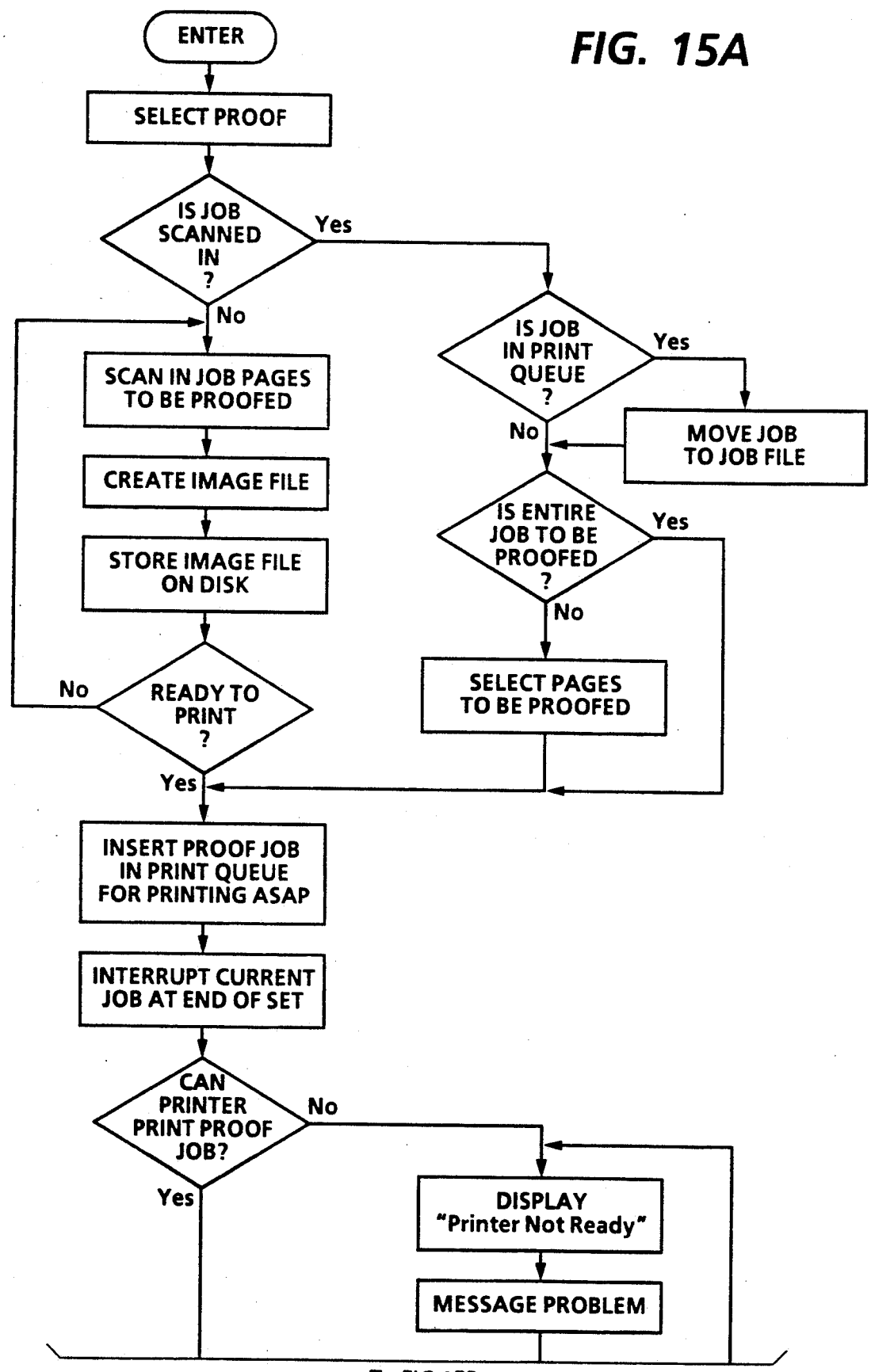
Figure 15B:
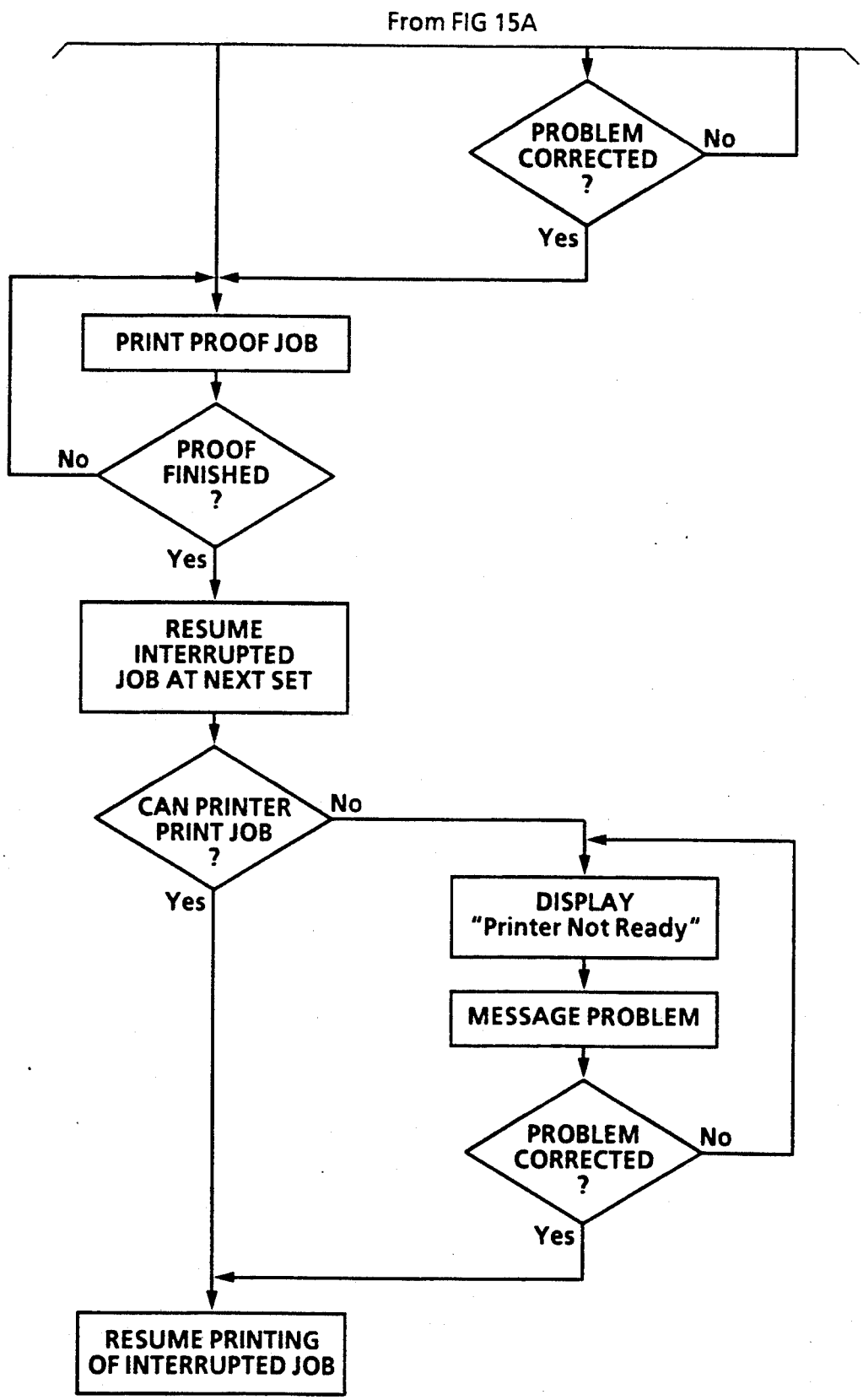

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 is a view depicting an exemplary job programming ticket and job scorecard displayed on the User Interface (UI) touchscreen of the printing system shown in FIG. 1;

FIG. 8 is a view depicting the job file and print queue;

FIG. 9 is a view of the User Interface touchscreen display depicting the job queue with typical files of in the system;

FIG. 10 is a view of the User Interface touchscreen display depicting the print queue with typical jobs to be printed;

FIG. 11 is a view of the User Interface touchscreen display depicting the PROOF selection icon;

FIG. 12 is a view depicting the print queue before and after insertion of a proof job in the queue, illustrating the manner in which the job currently being printed is interrupted by the proof job;

FIG. 13 is a view of the User Interface touchscreen display illustrating the manner in which a specific job in the job file is accessed for proofing;

FIG. 14 is a view of the User Interface touchscreen display illustrating the keyboard icon used to select the pages of the job shown in FIG. 13 to be proofed; and FIGS. 15A and 15B are a flow chart illustrating the proof process of the present invention.

Figure 2:
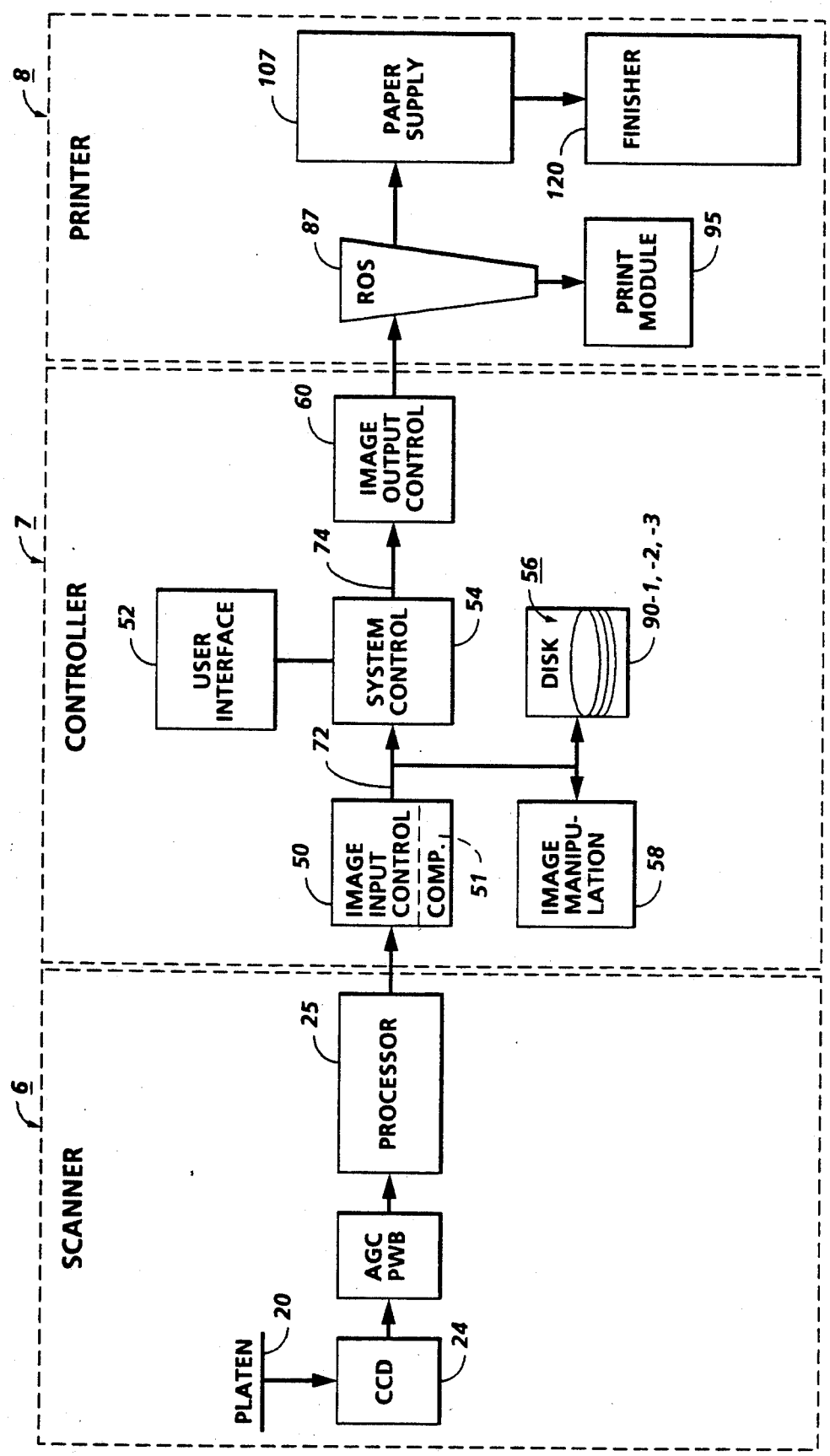
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
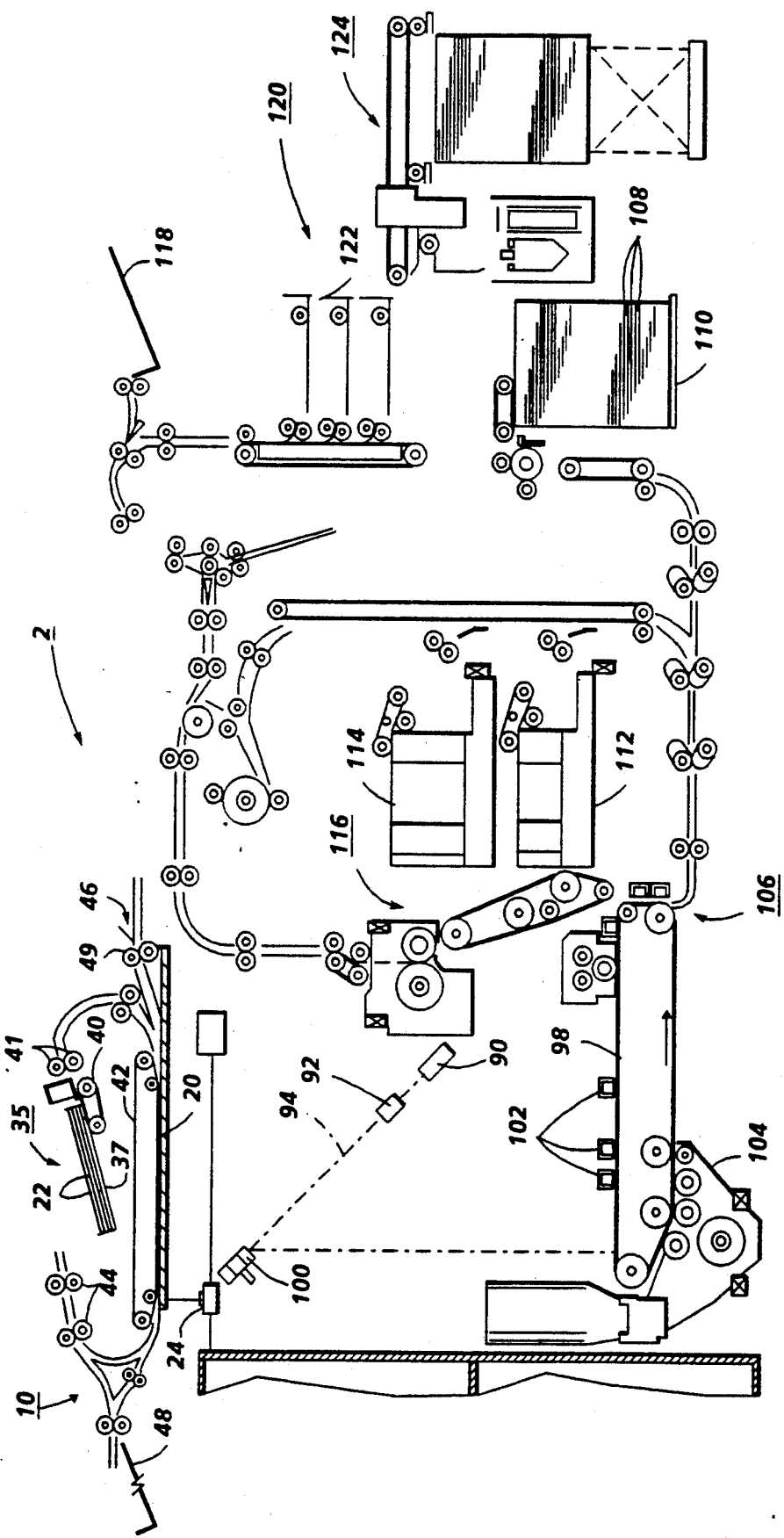
FIG. 3 is a plan view illustrating the principal mechanical components of the printing system shown in FIG. 1.
Figure 4:
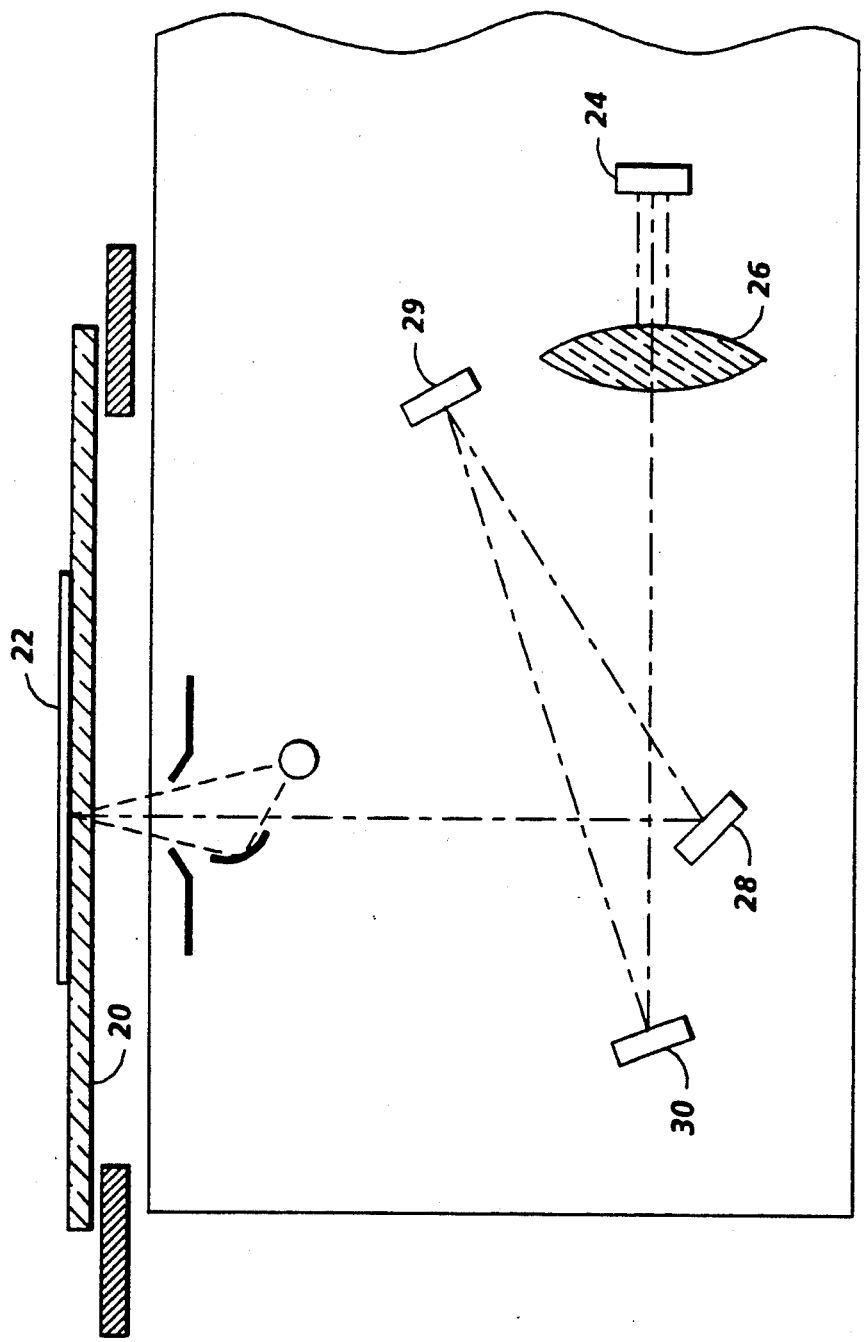
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other printing instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 (shown in FIG. 13) to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Items such as files and icons displayed on touchscreen 62 are described herein as being actuated or opened by selecting the item and either touching the displayed item on screen 62 or pointing curser 67 at the item and keying mouse 66.

Referring to FIG. 7 printing instructions for jobs are programmed in a Job Program mode in which there is displayed on touchscreen 62 a Job Ticket 150 and a Job Scorecard 152 for the job being programmed. Job Ticket 150 displays various job selections programmed, while Job Scorecard 152 displays the basic printing instructions to the system for printing the job. Various Job Ticket types are provided, with access by means of Job Types and Tickets icon 153. In the example shown in FIG. 7, the Job Ticket for printing a standard job is displayed.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

Referring to FIGS. 8 and 9, the image files are arranged in a job file 155, with the jobs 156 numbered consecutively in the order in which the jobs are scanned in. Where the operator wishes to see the jobs currently residing in job file 155, as for example, to select jobs to be moved to the print queue for printing, a JOB FILE icon 157 on touchscreen 62 is actuated. JOB FILE icon 157 and a PRINTER QUEUE icon 167 appear when the Job Ticket/Job Scorecard display of FIG. 7 for example is closed. This displays a job queue 160 of the jobs 156 currently in the job file on screen 62, an example of which is shown in FIG. 9. Each job is identified by a descriptor showing the type of job, job number, number of prints, etc. By using up and down scrolling icons 161, 162, the operator can scroll the list of jobs where the number of jobs in the job file is too large to be simultaneously displayed on touchscreen 62.

Referring also to FIG. 10, to print a job 156, the job is moved into a print queue 165. PRINTER QUEUE icon 167 on touchscreen 62, when actuated, displays the current print queue with a list of the jobs in the queue on touchscreen 62, an example of which is shown in FIG. 10. Each job in print queue 165 has a job descriptor identifying the job, job number, quantity to be printed, paper color, finishing type, etc. Print queue 165 is ordered by priority and time of arrival of the job in the print queue.

Where it is desired to process a job 156 before printing as, for example, to edit a job, the job queue 160 is displayed (if not already displayed on screen 62) and the particular job identified. The parts of the image file required for the processing selected are accessed, the image data de-compressed and converted to the resolution required for display on screen 62. When processing is completed, the image data is compressed and returned to main memory 56.

A job 156 in print queue 165 may be removed from queue 165 any time before printing has commenced and returned to the job file 155. In that case, the image file removed loses its position in the print queue.

For printing a job, the image file having compressed image data, image slice pointers, and descriptors of the job is read from disks 90-1, 90-2, 90-3 of main memory 56 into system memory 61. The image data is formatted and processed in blocks called bands. Band descriptors, which provide descriptions of the objects within a page, base addresses for all of the scanlines in the band, the start addresses for each band, and the starting position for each page, are created.

Using the image descriptors, band descriptors, and image slice pointers, packets of information, referred to as image parameter blocks containing all the information needed for the image generation processors 86 (seen in FIG. 5A) to retrieve the image data for processing and printing, are created. Processors 86 include a decoder, depredictor, and image generating logic to in effect de-compress the image data and provide the binary image data used by printer section 8 to make prints.

Following printing, the image file for the job is normally purged from memory 56 to make room a new job.

Referring to FIGS. 15A and 15B, where the operator desires to make proof prints of one or more pages of a job, or of the entire job, the proof function is selected.

Proof may be run before the job is scanned in, after the job is in the job file, or when the job is in the print queue. Typical uses of proof are to view a job before it is run, or during or after editing. This allows the operator to obtain a print of the job or of the edited page or pages prior to printing.

Referring also to FIG. 11, where the operator desires to proof a job before the job is run, the operator, when programming the job, selects proof by touching the PROOF icon 169 on touchscreen 62. PROOF icon 169 may be displayed on screen 62 by actuation of DESTINATION icon 171 (seen also in FIG. 7) on Job Scorecard 152. Actuation of PROOF icon 169 enables the document pages that comprise the job for proofing to be promptly scanned by ADH 35, and the document images converted to image signals.

Where the proof job has a relatively large number of pages, scanning is normally done by operating ADH 35 in the RDH mode. For operation in this mode, the documents 22 that comprise the proof job are loaded into document tray 37, ADH 35 actuated, and the documents scanned by array 24. Where the proof job is only a limited number of pages or consists of documents of odd sizes, the SADH mode may be used with the documents inserted one by one manually through slot 46 for scanning. Alternately, the manual mode may be used. Where the documents comprise a book, book mode scanning is used or in the case of fanfold documents, CFF mode is used.

An image file is created for the proof job in the usual manner and stored in main memory 56 pending use as described. To make proof prints, a copy of the image file is used since it is normally unknown at that time if the job will be saved and run or discarded.

Referring particularly to FIGS. 12 and 15A and B, when scanning of the proof job is sufficient to enable printing to begin, the proof job is inserted into the succession of jobs in print queue 165 for printing at the earliest possible moment. For this, the proof job is entered into the print queue not only ahead of any other job waiting to be printed (except in the case of another proof job as described hereinafter), but also into the image file of the job being printed at the earliest logical point at which printing can be stopped to commence printing the proof job. For example, where the job being printed is programmed for sets (i.e., 1—n, 1—n, 1—n, etc.), the job is interrupted at the end of the set in process and the image file for the proof job inserted. Where the job being printed is uncollated (i.e., n copies of page 1, n copies of page 2, etc.), the image file is interrupted at the last print of the page being printed and the image file for the print job inserted.

On detection of the first instructions in the image file for the proof job, printer section 8 is cycled down, interrupting the job currently being printed. The programming instructions for the proof job are loaded in and printer section 8 restarted. Using the image file for the proof job in main memory 56, the proof job is printed in accordance with the programming instructions for the job.

Where the program for the proof job requires a function that the printer is currently unable to perform (i.e., a different type of paper than is currently loaded in the paper trays), the system assumes a NOT READY state and printing of the proof job is inhibited. A message is displayed on touchscreen 62 informing the operator of the problem. The system will remain in the NOT READY state until either the deficiency is corrected or the proof job request canceled. In the event that the request for a proof job is canceled, the system reverts back to the job previously being processed.

As printing of the last page in the proof job is being completed, the image file for the uncompleted job that was interrupted is detected and printer section 8 cycles down to close the proof job and start resumption of the interrupted job at the point where the job was interrupted. Where changes in the system made to accommodate the proof job result in an inability of the system to now resume the interrupted job, the system assumes a NOT READY state, and further printing is prevented until the problem is rectified.

In cases where the job currently being printed is itself a proof job, interrupting of the job is not allowed. In that situation, the new proof job will be placed in print queue 165 after the proof job. Similarly, where several proof jobs are in print queue 165, the new proof job is placed in the queue at the end of the last proof job.

Where proof of some of the pages of a job rather than the entire job is desired, the basic procedure described above is followed. Here however, the pages in the job to be proofed must be identified or singled out. Where the job has not been scanned in, the pages to be proofed may be manually separated and scanned independently of the job by scanner section 6. The image file that is created for the proof pages is inserted into print queue 165 at the earliest logical point and ahead of any other jobs currently in the print queue (except in the case of a previous proof job) as described.

Referring to FIGS. 13–15A and B, where the job having pages to be proofed is already in the job file 155, the job queue 160 is displayed on touchscreen 62 in the manner described above (in the exemplary showing of FIG. 13, print queue 165 is also displayed). The job 156' (i.e., "Standard Job 111"—shown also in FIG. 9) having the page or pages to be proofed is highlighted by touching the particular job on touchscreen 62 or by using mouse 66 to point cursor 67 to the particular job and keying mouse 66. This displays a selection file 190 for the job number highlighted. Included in the selections provided by file 190 is PROOF 192. Actuating PROOF 192 displays a page selector icon 194 having a representation of a keyboard 195. By using the individual keys of keyboard 195, the page or pages of the job to be proofed are programmed in and stored. Following identification of the page or pages to be proofed, CLOSE icon 197 may be selected to close page selector icon 194 and in effect lock in the page selections made. Where no other selections are required, PROOF icon 169 is actuated to start the proof cycle. Where other programming selections are desired, CLOSE selection icon 198 on the job ticket (shown in FIG. 14) is actuated to return to the selection file 190 shown in FIG. 13. When all programming selections are completed, CLOSE selection 198 is actuated to close selection file 190 and PROOF icon 169 actuated in the manner described to implement printing of the proof copy.

The job currently being printed (except in the case of another proof job) is interrupted and the proof job having the page or pages identified for proofing is inserted into print queue 165. As described heretofore, the proof job is inserted in queue 165 ahead of the remainder of the interrupted job and before the other jobs in the print queue (except in the case where the job in process and the jobs waiting in the print queue are themselves proof jobs). Following printing of the last proof page to be proofed, the interrupted job is resumed.

Where it is desired to print a proof copy of a job already in print queue 165, the job is moved to job file 155. For this, the particular job in print queue 165 is highlighted, displaying selection file 190. By actuating MOVE 194, the job is moved back to job file 155 following which printing of a proof copy of the entire job or of selected pages of the job is implemented as described. Following printing of the proof copy, the job may be moved back to print queue 165 by actuation of MOVE 194. In this case however, the job is returned to print queue 165 at the end of the queue, the job having lost its position in print queue 165 by virtue of being moved out of the queue to make the proof copy.

In systems where proof can be selected while scanner section 6 is currently scanning in another job, scanning is interrupted at the first logical point to allow scanning of the proof job to commence as promptly as possible. Normally, interruption in the scanning cycle for this purpose is allowed only when scanning of the page currently being scanned is completed. Printing of the job in progress continues until scanning of the proof job is completed or at least sufficient to enable printing of the proof job to commence. At that point, the job being printed is interrupted and the proof job inserted into the print queue as described. When scanning of the last page in the proof job is completed, scanner section 6 resumes scanning of the interrupted job at the point where scanning was interrupted.

While the invention has been described with reference to the structure disclosed, it is not confined to the details set forth, but is intended to cover such modifications or changes as may come within the scope of the following claims.

We claim:

1. A method of operating an electronic printer to make proof prints, said printer processing printing jobs in accordance with printing instructions, each of said printing jobs comprising one or more pages of hard copy document originals, comprising the steps of:
   a) programming said printer with printing instructions for each printing job;
   b) scanning the document original pages that comprise each printing job and converting said pages to electronic pages;
   c) combining said electronic pages of each printing job with their corresponding printing instructions to provide a job file for each of said printing jobs;
   d) storing said job files in memory pending printing;
   e) forming a print queue with said job files in a preset printing priority for successive accessing of the job files;
   f) printing the electronic pages of said job files in accordance with the preset printing priority;
   g) for said proof prints, forming a job file for said proof prints, said proof prints representing a plurality of document pages;
   h) interrupting said job file succession in said print queue to insert the job file for said proof prints in said job file succession for printing said proof prints at the earliest opportunity;
   i) said printer, on detecting the job file for said proof prints, interrupting the job currently being printed;
   j) reprogramming said printer with the printing instructions from the job file for said proof prints;
   k) where the current operating mode of said printer is compatible with the instructions for printing said proof prints, restarting said printer and printing said proof prints;
   l) when printing of said proof prints is ending, reprogramming said printer with the printing instructions from the job file for said interrupted job; and
   m) resuming printing of the interrupted job.

2. The method according to claim 1 wherein the step of resuming includes the step of inhibiting resuming of printing where the current operating mode of said printer is incompatible with the printing instructions for resuming said interrupted job.

3. The method according to claim 1 including the steps of:
   a) programming proof printing instructions for said proof prints, said proof printing instructions including an instruction to make said proof prints;
   b) scanning the pages that comprise said proof prints to convert said pages to electronic pages;
   c) combining said electronic pages of said proof prints with said proof printing instructions to provide the job file for said proof prints; and
   d) continuing printing of the job file currently being printed in said print queue until the job file for said proof prints is built up to a point sufficient to enable printing of said proof prints to start.

4. The method according to claim 1 including the step of:
   programming instructions to proof plural selected pages in the job file for said proof prints.

5. The method according to claim 1 including the steps of:
   a) printing said interrupted file in sets; and
   b) inserting said job file for said proof prints in said job file succession at the end of the set currently being printed.

6. The method according to claim 1 including the steps of:
   a) printing said interrupted file in blocks of N pages each; and
   b) inserting said job file for said proof prints in said job file succession at the end of the last page in the block of N pages being printed.

7. A method of operating an electronic printer to make proof prints, said printer processing printing jobs in accordance with printing instructions, each of said printing jobs comprising one or more pages of hard copy document originals, comprising the steps of:
   a) programming said printer with printing instructions for each printing job;
   b) scanning the document original pages that comprise each printing job and converting said pages to electronic pages;
   c) combining said electronic pages of each printing job with its corresponding printing instructions to provide a job file for each of said printing jobs;
   d) storing said job files in memory pending printing;
   e) forming a print queue with said job files in a preset printing priority for successive accessing of the job files;
   f) printing the electronic pages of said job files in accordance with the preset printing priority;
   g) programming printing instructions for a next job including instructions to make a proof print of said next job;
   h) scanning the pages that comprise said next job to convert said pages to electronic pages;
   i) combining said electronic pages of said next job with the printing instructions for said next job to provide a job file for said next job;

j) continuing printing of the job file currently being printed in said print queue until the job file for said next job is built up to a point sufficient to enable printing of said proof print for said next job to start;

k) interrupting said job file succession in said print queue to insert the job file for said next job in said job file succession for printing said proof print at the earliest opportunity;

l) said printer, on detecting the job file for said next job, interrupting the job currently being printed;

m) reprogramming said printer with the printing instructions from the job file for said next job;

n) printing said proof print in response to said printing instructions;

o) detecting said interrupted job file as printing of said proof print for said next job is ending;

p) reprogramming said printer with the printing instructions from the job file for said interrupted job; and q) resuming printing of the interrupted job file.

8. A method of making a proof print of a job while printing jobs, said jobs consisting of documents that are scanned to convert the document images to image signals for use in making prints, comprising the steps of:

a) for each job, providing a job file with processing instructions;

b) scanning the job documents to provide image signals for use in making prints;

c) providing each job file with a set of image signals from a selected one of the jobs;

d) arranging said job files for said jobs in an ordered queue for printing;

e) printing said image signals for each of said jobs in the order in which said job files are arranged in said queue;

f) providing a job file with processing instructions for a new job including instructions to make a proof print of said new job;

g) interrupting scanning of the documents for the job currently being scanned to scan the documents for said new job while continuing uninterrupted printing of the job files currently in said queue;

h) scanning the documents comprising said new job to provide image signals for use in making said proof print;

i) placing the job file for said new job in said print queue ahead of the job files in said queue when scanning of said new job is completed or at least sufficient to enable printing of said proof print to be started;

j) interrupting the job file currently being printed to commence printing said proof print of said new job using said image signals of said new job;

j) following scanning of the last document in said new job, resuming scanning of the documents of said interrupted job file; and k) when printing of said proof print for said new job is completed, resuming printing of the interrupted job file.

9. The method according to claim 8 including the steps of:

arranging the processing instructions in said job files with page boundaries; and for making said proof print of said new job, placing the job file for said new job in said queue ahead of the next page boundary to be printed.

10. A method of operating an electronic printer to make proof prints, said printer processing printing jobs in accordance with printing instructions, each of said printing jobs comprising one or more pages of hard copy document originals, comprising the steps of:

a) programming said printer with printing instructions for each printing job;

b) scanning the document original pages that comprise each printing job and converting said original pages to electronic pages;

c) combining said electronic pages of each printing job with their corresponding printing instructions to provide a job file for each of said printing jobs;

d) storing said job files in memory pending printing;

e) forming a print queue with said job files in a preset printing priority for successive accessing of the job files therefor when printing said jobs; and f) making proof prints of one of said jobs by 1) placing copies of the electronic pages to be proofed in a proof job file together with programming instructions from the job file of said one job;

2) interrupting said job file succession in said print queue to insert said proof job file in said job file succession for printing said proof prints at the earliest opportunity;

3) said printer, on detecting said proof job file, interrupting the job currently being printed;

4) reprogramming said printer with the printing instructions from said proof job file;

5) printing said proof prints;

6) detecting said interrupted job file as printing of said proof prints is ending;

7) reprogramming said printer with the printing instructions from the job file for said interrupted job; and 8) resuming printing of the interrupted job.

* * * * *